July 26, 1949.                C. D. OTTERSON                2,477,263
                    WELDED BRACE ANCHORAGE FITTING
                      FOR TUBULAR FRAME STRUCTURES
                          Filed Sept. 25, 1947
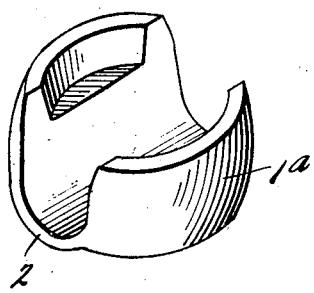
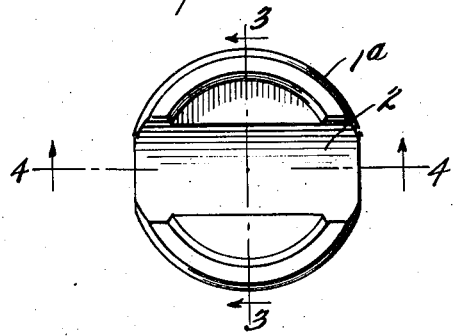
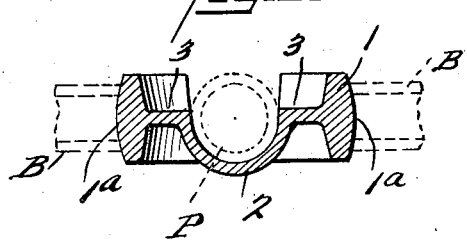
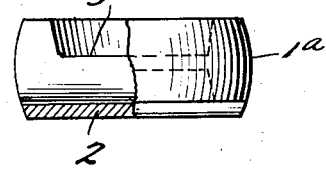
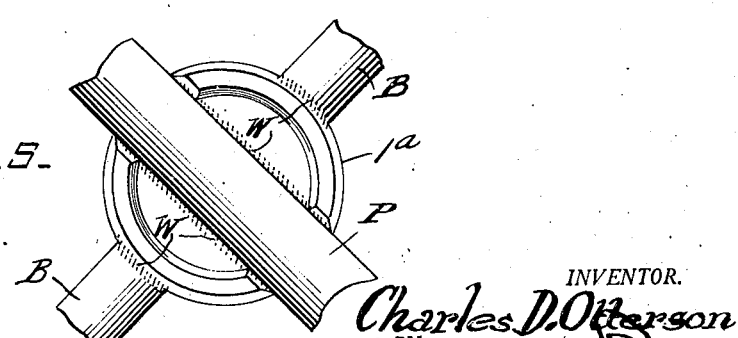
INVENTOR.
Charles D. Otterson
BY
ATTORNEY Patented July 26, 1949

2,477,263

UNITED STATES PATENT OFFICE 2,477,263

WELDED BRACE ANCHORAGE FITTING FOR TUBULAR FRAME STRUCTURES

Charles D. Otterson, Kintnersville, Pa., assignor to Nassau Products, Allentown, Pa., a corporation of Pennsylvania Application September 25, 1947, Serial No. 776,103

6 Claims. (Cl. 287—54)

1

This invention relates to welded metallic fittings of the type used in the manufacture of tubular frame structures and it aims more especially to provide an improved fitting of the general class adapted to be supported upon one pipe and serve as an anchorage or footing for the end of another pipe, both of the pipes being welded to the fitting.

An important object of the invention is to provide a welded brace anchorage fitting of generally disk shape and having a channel extending across a face thereof arranged to seat over and make part-circumferential engagement with a supporting pipe to which the fitting is to be welded. The circumference of the fitting is of spheroidal shape so as to insure solid circular-line contact with the square cut ends of a plurality of radially-disposed brace pipes abutting there against. By "square cut" as used herein is meant the cut produced by severing a pipe in a plane perpendicular to its longitudinal axis.

Another object of my invention is to provide a welded brace anchorage fitting of the above character in which the channel is semi-circular in transverse cross-section and adapted to snugly fit upon the circumference of a supporting pipe so that the longitudinal axis of the supporting pipe lies approximately in the medial plane of the fitting.

A further object of my invention is to provide a welded brace anchorage fitting comprising a rim of substantial width and having a spheroidally shaped circumferential portion, a channel section extending diametrically across a face of the fitting and comparatively thin webs extending in a medial plane between the rim and the channel section.

Other objects and advantages will be apparent from the following detailed description of a preferred embodiment of the invention, reference being had to the annexed drawing in which:

Figure 1 is a perspective view of a welded brace anchorage fitting embodying the invention;

Figure 2 is a top plan view of the fitting of Fig. 1;

Figure 3 is a transverse cross-sectional view of the fitting taken on the line 3—3 of Fig. 2;

Figure 4 is a transverse cross-sectional view of the fitting taken on the line 4—4 of Fig. 2; and Figure 5 is a view illustrating one manner in which the fitting is adapted to be used in making a welded joint in a tubular frame structure.

The welded brace anchorage fitting shown in the drawing comprises a unitary, generally disk-shaped metallic member having a rim section 1, a channel section 2 and web sections 3 extending between the rim and channel sections in the medial plane of the fitting. The circumference of the rim section is spheroidally curved, as indicated at 1a in Figs. 3 and 4 and extends completely around the rim except for interruptions at diametrically opposite localities on the fitting to provide open ends for the channel section 2.

The channel section 2 comprises a comparatively thin web of metal of semicircular shape, the concave side of the channel being adapted to snugly seat about the circumference of a supporting pipe, tube or rod P, indicated generally in broken lines in Fig. 3, so that the axis of the pipe lies approximately in the medial plane of the fitting. Since the width of the rim 1 will preferably equal the diameter of the size of supporting pipe P to which it is intended to be applied, the bottom of the channel section will project slightly outwardly beyond one side plane of the fitting by the thickness of the web forming the bottom of the channel, as best shown in Fig. 3.

The upper longitudinal edges of the channel 2 are connected to the rim 1 of the fitting by webs 3, of somewhat greater thickness than the wall of the channel 2, which extend in the medial plane of the fitting and join the inner circumference of the rim.

The one-piece fitting described is made of a suitable metal, such as steel, capable of being welded, brazed or soldered, and it may be expeditiously manufactured either by casting or forging.

The contemplated manner of use of the fitting is as follows, reference being had to Fig. 5: The fitting is applied flatwise against a supporting pipe P so that the circumference of the pipe seats snugly within the bottom of the channel section 2. Welding metal W is next deposited between the sides of the pipe and the sides (or the upper edges) of the channel thus strongly bonding the fitting to the supporting pipe P. The fitting thus constitutes an anchorage for the ends of the brace pipes B (also indicated in broken lines in Fig. 3). The ends of the brace pipes are cut off square and hence they make continuous, circular-line contact with the spheroidal circumferential surface of the rim 2 regardless of whether the brace pipes lie exactly in the same plane with the fitting or are inclined slightly out of its plane. Thus it is not necessary to precisely line up the brace pipes in the plane of the fitting preliminary to welding the ends of the brace pipes to the fitting as indicated at W.

An advantage of the fitting described above is that the pipes to be welded may be rapidly assembled preparatory to welding and a strong joint between the supporting pipe P and the brace pipes B may be effected through the intermediary of the anchorage fitting. Because the axis of the supporting pipe lies in, or approximately in, the medial plane of the fitting any thrusts transmitted through the brace pipes B, either prior or subsequent to welding, imparts no unbalanced force to the fitting such as would tend to cause it to shift its position upon the pipe P. Since the fitting only slightly exceeds the width of the supporting pipe P, the fittings may be placed in close parallel relation, such as is necessary in certain tubular frame structures.

The term "welded" is used herein in a general sense to also include brazed, soldered or similarly bonded joints such as are well-known in the metal working arts.

While I have described a preferred form of my welded brace anchorage fitting for tubular frame structures, it is to be understood that various and reasonable changes in construction and design from those herein described and illustrated may be made without departing from the spirit of my invention as defined by the following claims.

I claim:

1. A unitary metallic welded brace anchorage fitting of generally disk shape having a relatively wide circumferential rim portion of spheroidal form and a channel extending across a lateral face of the fitting and opening through said rim portion.

2. A unitary metallic brace anchorage fitting of generally disk shape having a relatively wide circumferential rim portion of spheroidal form and a channel extending entirely across a lateral face of the fitting and opening through said rim portion, the bottom of said channel lying substantially in the plane of one of the circumferential edges of said rim.

3. A unitary metallic welded brace anchorage fitting of generally disk shape having a relatively wide circumferential rim portion of spheroidal form, a channel extending entirely across a lateral face of the fitting and opening through said rim portion and webs extending substantially medially of the fitting between the rim portion and the channel.

4. A unitary metallic welded brace anchorage fitting of generally disk shape having a relatively wide circumferential rim portion of spheroidal form, a channel of arcuate cross-section extending diametrically and entirely across a lateral face of the fitting and opening through said rim portion and webs of substantially less thickness than the width of the rim portion extending between the rim portion and the channel.

5. A unitary metallic welded brace anchorage fitting of generally disk shape having a relatively wide circumferential rim portion of spheroidal form, a channel of approximately semi-circular cross-section extending diametrically and entirely across a lateral face of the fitting and opening at its opposite ends through said rim portion and webs of substantially less thickness than the width of the rim extending between the rim portion and the upper longitudinal edges of the channel.

6. A unitary metallic welded anchorage brace fitting as defined in claim 5 in which the webs are disposed substantially medially between the two planes including opposite edges of the rim portion and in which the bottom of the channel lies substantially in one of said planes.

CHARLES D. OTTERSON.

REFERENCES CITED

The following references are of record in the file of this patent:

UNITED STATES PATENTS

| Number | Name | Date |
| --- | --- | --- |
| 1,192,039 | Converse | July 25, 1916 |
| 1,762,766 | De Garay | June 10, 1930 |